US008701400B2

(12) United States Patent
Kondo et al.

(10) Patent No.: US 8,701,400 B2
(45) Date of Patent: Apr. 22, 2014

(54) ELECTRO-HYDROSTATIC ACTUATOR EXCELLENT IN SNUBBING CHARACTERISTIC, AND DRIVE DEVICE USED FOR THE SAME, AND CONTROL METHOD USED FOR THE SAME

(75) Inventors: Taku Kondo, Hyogo (JP); Toshiyuki Kumada, Hyogo (JP); Masayuki Takada, Hyogo (JP); Kazuhiro Masutani, Hyogo (JP); Masaaki Monte, Mie (JP); Hiroshi Saito, Mie (JP); Satoshi Ihara, Mie (JP)

(73) Assignees: Sumitomo Precision Products Co., Ltd., Hyogo (JP); Sinfonia Technology Co., Ltd., Tokyo (JP)

( * ) Notice: Subject to any disclaimer, the term of this patent is extended or adjusted under 35 U.S.C. 154(b) by 794 days.

(21) Appl. No.: 12/943,452

(22) Filed: Nov. 10, 2010

(65) Prior Publication Data
US 2011/0107756 A1 May 12, 2011

(30) Foreign Application Priority Data

Nov. 10, 2009 (JP) ................................ 2009-257410

(51) Int. Cl.
*F15B 11/028* (2006.01)
(52) U.S. Cl.
USPC .............................................. 60/431; 60/476
(58) Field of Classification Search
USPC .................... 60/428, 431, 449, 473, 475, 476
See application file for complete search history.

(56) References Cited

U.S. PATENT DOCUMENTS

| 3,855,791 | A  | * | 12/1974 | Quinto ............................ 60/476 |
| 7,513,112 | B2 | * | 4/2009  | Sato et al. ........................ 60/475 |
| 8,448,432 | B2 | * | 5/2013  | Bresie ............................. 60/476 |

FOREIGN PATENT DOCUMENTS

| DE | 38 19 490   | 12/1989 |
| EP | 1 793 127   | 6/2007  |
| EP | 1 835 181   | 9/2007  |
| GB | 2 319 566   | 5/1998  |
| JP | 8-61310     | 3/1996  |
| JP | 2000-87915  | 3/2000  |
| JP | 2002-188602 | 7/2002  |
| JP | 2007-239974 | 9/2007  |
| WO | 01/62532    | 8/2001  |

* cited by examiner

*Primary Examiner* — Thomas E Lazo
(74) *Attorney, Agent, or Firm* — Clark & Brody (57) ABSTRACT

The present invention is to provide an electro hydrostatic actuator excellent in a snubbing characteristic including a cylinder type actuator main body 1, a piston 2 having a piston rod, the piston slidingly moving in a cylinder of the actuator main body, a motor 18, a pump 19 for supplying fluid according to the rotation of the motor, a mechanism for adjusting a running amount of the fluid into and from the cylinder according to the motion of the piston, and a reservoir 8 for adjusting the supply of the fluid corresponding to a volume difference generated according to the motion of the piston, and a controller 17 which controls the number of revolutions of the motor according to the calculated load torque, and a snubbing control method used for this. An electro hydrostatic actuator of realizing a snubbing mechanism capable of increasing energy efficiency, when used for a landing gear retraction/extension device of an airplane, can be provided.

6 Claims, 6 Drawing Sheets

◿ discharge flow from pump
◿ running flow into pump

FIG. 4

▱▱ discharge flow from pump
▱▱ relief valve-passing flow
▱▱ running flow into pump

ELECTRO-HYDROSTATIC ACTUATOR EXCELLENT IN SNUBBING CHARACTERISTIC, AND DRIVE DEVICE USED FOR THE SAME, AND CONTROL METHOD USED FOR THE SAME

BACKGROUND OF THE INVENTION

1. Field of the Invention

The present invention relates to an electro-hydrostatic actuator (EHA) in which a motor, a pump, and an actuator are integrated, to a drive device used for the same, and to a control method used for the same. In more detail, the present invention relates to an electro hydrostatic actuator excellent in a snubbing function of relaxing impact at a retracted position and an extended position at the time of retracting and extending the landing gear of an airplane, and a drive device used for the same, and a control method used for the same.

2. Description of the Related Art

Conventionally, an airplane is equipped with a hydrostatic supply system, and the landing gear is retracted or extended by an actuator with utilizing hydrostatic force thereof. In reference to the actuator for retracting and extending the gear, for relaxing impact due to collision between a piston end and a cylinder end at a retracted position or an extended position, a snubbing mechanism for reducing travelling speed of the piston is provided.

In some of the above snubbing mechanism, when the piston comes close to a cylinder bottom or a gland nut, a running amount of fluid into and from the cylinder is decreased by narrowing down fluid path or by other way, so that the travelling speed of the piston is reduced.

In this case, since the running amount of the fluid is temporarily decreased, the fluid flowing into the actuator gets highly pressurized, so that breakage failure etc. of related equipments may be caused. In order to prevent such breakage failure of equipments, a relief valve or the like is arranged in a hydrostatic circuit, so that the pressure of the fluid flowing into the actuator is maintained to not more than a predetermined value.

For example, Japanese Patent Application Publication No. 1996-61310 offers a proposal relating to a hydrostatic cylinder used for airplane landing gear or the like. Specifically, a snubbing piston capable of moving a preset stroke from a cylinder bottom is arranged so as to form a buffering fluid chamber, and a predetermined amount of fluid is introduced into the buffering fluid chamber via an orifice at the time of extending a piston. When the piston is abutted with the snubbing piston at the time of retraction, a predetermined amount of the fluid is discharged through the orifice, so that a running amount of the fluid into and from a cylinder is decreased, thus controlling and reducing travelling speed of the piston. Such a hydrostatic cylinder is proposed.

SUMMARY OF THE INVENTION

Figure 1:
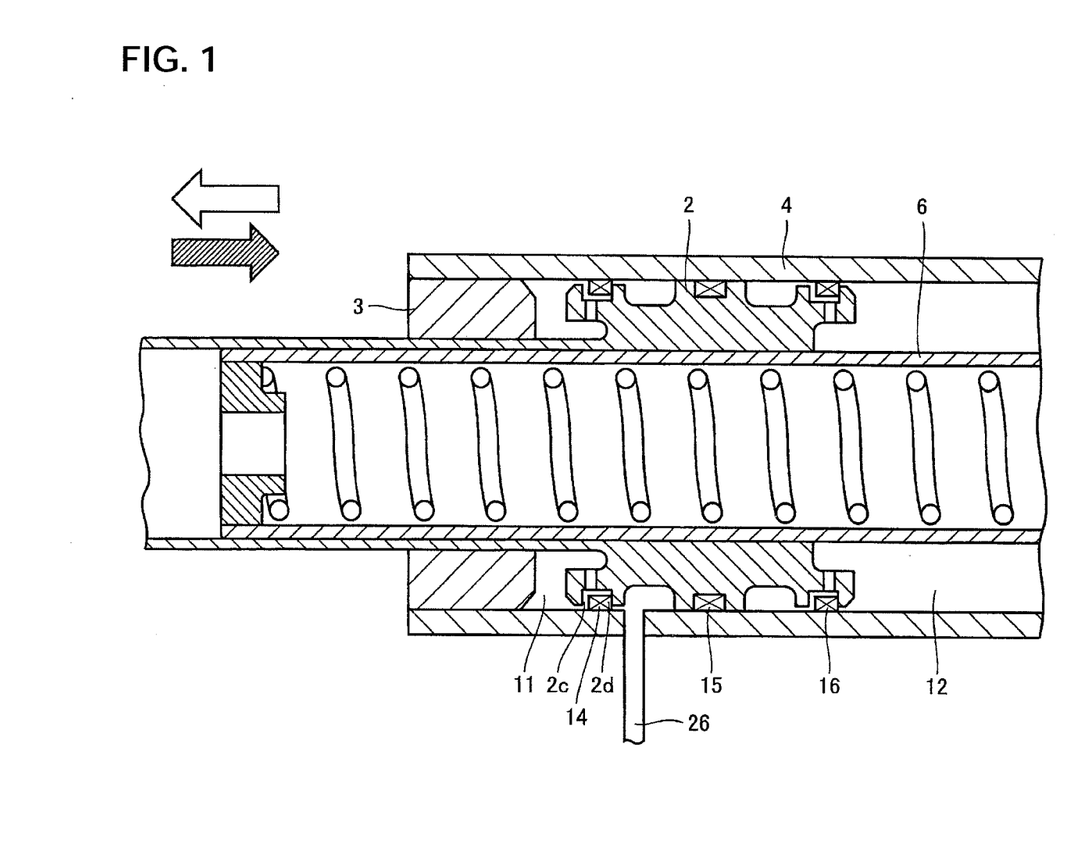
FIG. 1 is a detailed sectional view of the annulus side of a cylinder type actuator and a piston unit for illustrating one example of a snubbing mechanism adopted in a conventional cylinder type actuator.

FIG. 1 is a detailed sectional view of the annulus side of an actuator and a piston unit for illustrating one example of a snubbing mechanism adopted in a conventional cylinder type actuator. The cylinder type actuator shown in the figure includes a cylinder 4, a piston 2 slidingly moving in the cylinder 4, and a gland nut 3. A seal 15 is disposed in the piston 2 so that fluid does not leak out from the gap between the piston 2 and the cylinder 4.

In order to regulate a running amount of fluid into and from the cylinder during a snubbing action, a snubber ring 14 and a snubber ring 16 are disposed. The cylinder 4 is provided with an annulus side fluid chamber 11, a bore side fluid chamber 12, a retraction side channel port 26, and an extension side channel port 27 (not shown).

A hydrostatic system using the cylinder type actuator shown in FIG. 1 is provided with, though not shown, a pump for discharging fluid, a motor for rotating the pump, a reservoir for regulating the supply of fluid corresponding to a volume difference generated according to the motion of the piston 2, and a relief valve for limiting hydrostatic pressure of the fluid flowing into the actuator to not more than a predetermined value, on the outside of the actuator.

First, an action of the cylinder type actuator when the piston 2 is extended (a white arrow) will be described. When the pump is rotated by the motor, fluid flows into the bore side fluid chamber 12. The fluid is sufficiently supplied into the bore side fluid chamber 12, and the piston 2 moves to the extension side. When the piston 2 moves to the extension side, the fluid of the annulus side fluid chamber 11 flows out from the retraction side channel port 26.

Next, an action of the cylinder type actuator when the piston 2 exerts retraction (a hatched arrow) will be described. When the motor is rotated in the reverse direction to the case of extending, the fluid discharged from the pump flows into the annulus side fluid chamber 11. The fluid is sufficiently supplied into the annulus side fluid chamber 11, and the piston 2 moves to the retraction side. When the piston 2 moves to the retraction side, the fluid of the bore side fluid chamber 12 flows out from the extension side channel port 27.

Further, an action of the snubbing mechanism will be described based on FIG. 1. When the piston 2 is extended and brought to the vicinity of the gland nut 3, the piston 2 covers the retraction side channel port 26. At this time, along with the movement of the piston 2, the snubber ring 14 is pushed toward a side surface 2d of a groove of the piston 2, the side surface being on the cylinder bottom side, and moves.

The snubber ring 14 has a structure in which slits are provided on a cylindrical body. Since an area of slits is smaller than that of an opening of the retraction side channel port 26, running amount of the fluid from the annulus side fluid chamber 11 through the snubber ring 14 to the retraction side channel port 26 is reduced. Thereby, when the piston 2 is extended, travelling speed of the piston 2 is reduced in the vicinity of the gland nut, so that a snubbing function works.

In such a way, the conventional cylinder type actuator realizes the snubbing mechanism by regulating the running amount of fluid distributed to and from the cylinder according to the motion of the piston. Thus, there are following problems.

While the snubbing mechanism is activated, the running amount of the fluid distributed to and from the cylinder is decreased. Meanwhile, since the motor is rotated at a speed of the predetermined number of revolutions, a predetermined amount of fluid is discharged from the pump. Therefore, the running amount of fluid distributed to and from the cylinder is decreased, and an excess fluid is circulated in a hydrostatic circuit.

Therefore, since the excess fluid is circulated in the hydrostatic circuit, useless energy is not utilized efficiently, thus leading up to an enormous energy loss. In operating the airplane in which fuel consumption management is important, such an energy loss is problematic.

In the case where the excess fluid is circulated in the hydrostatic circuit during the activation of the snubbing mechanism, the fluid circulated in the hydrostatic circuit is repeatedly pressurized by the pump and depressurized by the relief value installed in the hydrostatic circuit. Work in association with a volume change due to the pressurization and the depressurization is transformed into thermal energy. Thus, during the activation of the snubbing mechanism, a temperature of the fluid in the hydrostatic circuit is gradually increased.

When the temperature of the fluid is gradually increased, a temperature of equipments is also increased. Accordingly, there is a fear that breakage failure of equipments is caused. When the temperature of the fluid is increased, the volume of the fluid is expanded. Thus, there is also a fear that breakage failure of the reservoir or the like is caused.

The circulation of the excess fluid in the hydrostatic circuit indicates that a controller and the motor are uselessly working. Thus, there is a fear that temperatures of the controller and motor are increased by heat generation along with operation at this time, so that the controller and motor are broken.

Meanwhile, in case of an electro hydrostatic actuator, the EHA capable of freely changing the control of the number of revolutions for a pump according to the stroke, the EHA being excellent in snubbing with improved energy efficiency can be configured. However, there is a need for installing a sensor for detecting stroke positions of the EHA. Thus, the configuration becomes complicated, and accrues the weight increase.

The present invention is achieved in consideration with the above problems, and an object thereof is to provide an actuator excellent in a snubbing characteristic for relaxing impact due to collision between the piston and the cylinder, improving the energy efficiency during the snubbing action, and preventing breakage failure of the actuator due to the increase in the temperature of fluid, without installing a sensor for detecting stroke positions of the actuator.

As a result of observing changes within the electro hydrostatic actuator during the activation of the snubbing mechanism in order to solve the above problems, the present inventors found that load torque of the motor is increased while the snubbing mechanism is activated, compared with that when the snubbing mechanism is not activated.

Thus, the load torque imposed on the motor is calculated by the controller from an electric current value and the number of revolutions of the motor that constitutes the electro hydrostatic actuator, and the number of revolutions of the motor is controlled according to the load torque imposed on the motor.

Adjusting a flow rate of the fluid discharged from the pump by controlling the number of revolutions of the motor makes it possible to easily realize the electro hydrostatic actuator excellent in the snubbing characteristic capable of relaxing impact due to collision between the piston and the cylinder, while allowing the energy efficiency to be improved during the snubbing action, and preventing the breakage failure of equipments due to the increase in the temperature of fluid.

When the number of revolutions of the motor is controlled according to the load torque of the motor, the heat generation of the controller and the motor can be suppressed, so that the breakage failure of these equipments can be prevented.

The present invention is completed based on the above findings, and the gist thereof consists in an electro hydrostatic actuator described in (1) and (2) as below, and a drive device for an electro hydrostatic actuator described in (3) and (4) as below, and a method for controlling snubbing for an electro hydrostatic actuator described in (5) and (6) as below.

(1) An electro hydrostatic actuator excellent in a snubbing characteristic, comprising a cylinder type actuator main body, a piston having a piston rod, the piston slidingly moving in a cylinder of the actuator main body, a motor, a pump for supplying fluid according to the rotation of the motor, a mechanism for adjusting a running amount of fluid into and from the cylinder according to the motion of the piston, a reservoir for adjusting the supply of fluid corresponding to a volume difference generated according to the motion of the piston, and a control means which calculates load torque imposed on the motor from an electric current value and the number of revolutions of the motor, and which controls the number of revolutions of the motor according to the calculated load torque imposed on the motor.

(2) In the electro hydrostatic actuator described in the above section (1), the control means may control the motor so that the number of revolutions becomes lower when the load torque imposed on the motor exceeds a predetermined value. This configuration is desirable since the temporal decrease in the flow rate of the fluid discharged from the pump can be easily and reliably obtained according to the load torque imposed on the motor.

(3) A drive device used for an electro hydrostatic actuator excellent in a snubbing characteristic including a motor for driving a pump, the pump for supplying fluid to two fluid chambers of a cylinder partitioned by a piston, and a controller which calculates load torque imposed on the motor from an electric current value and the number of rotations of the motor, and which controls the number of revolutions of the motor according to the calculated load torque imposed on the motor.

(4) In the drive device described in the above (3), the controller may control the motor so that the number of revolutions becomes lower when the load torque imposed on the motor exceeds a predetermined value. This configuration is desirable since the drive device for the electro hydrostatic actuator excellent in the snubbing characteristic can be easily and reliably obtained.

(5) A method for controlling snubbing to be applied to an electro hydrostatic actuator including a cylinder type actuator main body, a piston having a piston rod, the piston slidingly moving in a cylinder of the actuator main body, a motor, a pump for supplying fluid according to the rotation of the motor, a controller which calculates load torque of the motor from an electric current value and the number of revolutions of the motor, and which controls the rotation of the motor, a mechanism for adjusting a running amount of the fluid into and from the cylinder according to the motion of the piston, and a reservoir for adjusting the supply of fluid corresponding to a volume difference generated according to the motion of the piston, wherein the number of revolutions of the motor is controlled according to the load torque calculated by the controller.

(6) In the method for controlling subbing for the actuator described in the above (5), in controlling the rotation of the motor, it may be done so that the number of revolutions becomes lower when the load torque calculated by the controller exceeds a predetermined value. This configuration is desirable since the temporal decrease in the flow rate of the fluid discharged from the pump can be easily and reliably obtained according to the load torque of the motor.

Further, when the actuator excellent in the snubbing characteristic described in the above (1) and (2), and the drive device for the actuator described in the above (3) and (4), and the method for controlling snubbing for the actuator described in the above (5) and (6) are used for retraction and extension of the landing gear of an air plane, the shock/impact at the time of retracting and extending the gear can be absorbed, the energy efficiency can be increased, and the breakage failure of the actuator along with the increase in the temperature of fluid and the breakage failure of the drive device along with the increase in the temperature of the drive device can be prevented.

In the present invention, the phrase "excellent in a snubbing characteristic" means that the impact due to collision between the piston and the cylinder can be relaxed, excellent energy efficiency during the snubbing action can be obtained, and the increase in the temperature of fluid and the increase in the temperature of the drive device can be suppressed to be low.

The electro hydrostatic actuator of the present invention, the drive device used for the same, and the method for controlling snubbing for the same are characterized in controlling the number of revolutions of the motor according to the load torque imposed on the motor as a snubbing operation of the actuator.

Therefore, according to the electro hydrostatic actuator of the present invention, there are remarkable effects of relaxing impact due to collision between the piston and the cylinder, obtaining excellent energy efficiency during the snubbing action, and suppressing the increase in the temperature of fluid to be less. Thus, the energy efficiency of the actuator is increased, and the increase in the temperature of fluid and the increase in the temperature of the drive device are mitigated, so that the breakage failure of the actuator and drive device can be prevented.

When the electro hydrostatic actuator of the present invention, and the drive device for the same, and the method for controlling snubbing for the same are used for the retraction and the extension of the landing gear of the airplane, improvement in fuel consumption during flight, and reduction in maintenance time attributable to the breakage failure of the actuator and/or the breakage failure of the drive device can be realized.

BRIEF DESCRIPTION OF THE DRAWINGS

FIGS. 5A and 5B are graphs showing relationships between load torque etc of a motor, and elapsed time in the conventional cylinder type actuator.

FIGS. 6A and 6B are graphs showing relationships between load torque etc of a motor, and elapsed time in the electro hydrostatic actuator of the present invention.

DETAILED DESCRIPTION OF THE PREFERRED EMBODIMENTS

Hereinafter, configuration examples of an electro hydrostatic actuator of the present invention and a drive device for the same will be shown, and a method for controlling snubbing used for the same will be described based on the drawings.

Figure 2:
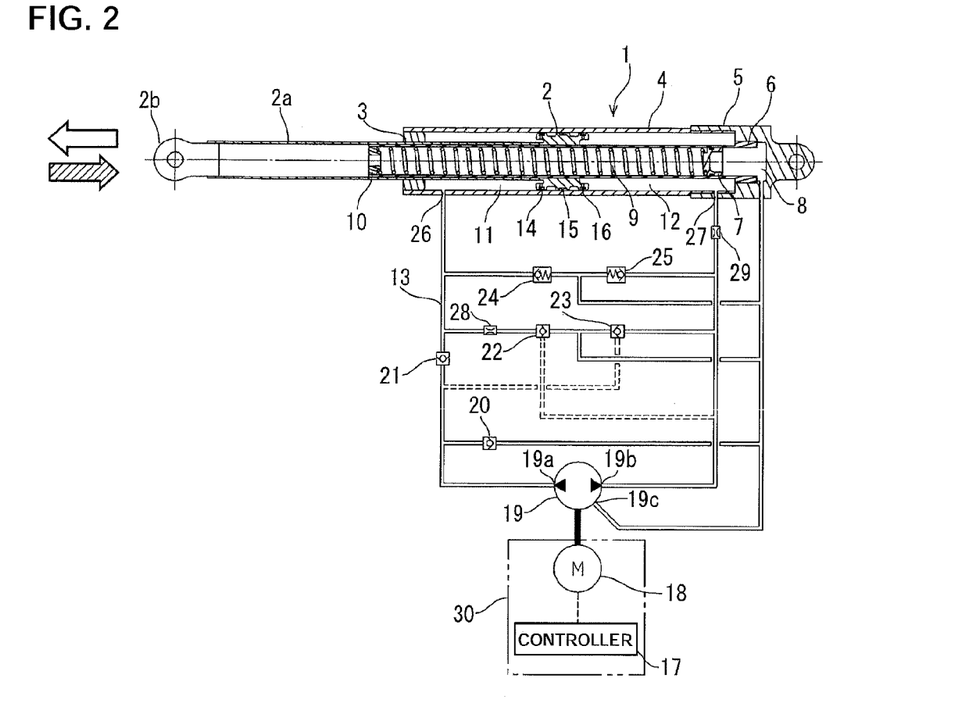
FIG. 2 is a sectional view showing an electro hydrostatic actuator of the present invention, and a piping configuration example applied to the same.

FIG. 2 is a sectional view showing the electro hydrostatic actuator of the present invention, and a piping configuration example applied to the same. The electro hydrostatic actuator shown in the figure includes an actuator main body 1, a piston 2 which slidingly moves in a cylinder 4 of the actuator main body 1, a motor 18, a pump 19, a controller 17 which calculates load torque imposed on the motor 18 and which controls the rotation of the motor 18, a fluid piping 13, relief valves 24 and 25 for adjusting a flow rate of fluid, check valves 20 and 21 for preventing the fluid flow from reversing its direction, and pilot check valves 22 and 23 for controlling the direction of fluid by pilot pressure.

The controller 17 realizes a control means for calculating the load torque imposed on the motor 18 and controlling the number of revolutions of the motor 18 according to the load torque.

The actuator main body 1 includes the cylinder 4 having a hollow structure, a gland nut 3, a cylinder bottom 5, a standpipe 6, a reservoir piston 7, a coil spring 9, and a stand head 10. The actuator main body 1 is provided with an annulus side fluid chamber 11, a bore side fluid chamber 12, a reservoir fluid chamber 8, a retraction side channel port 26, and an extension side channel port 27.

The reservoir piston 7 slidingly moves in the standpipe 6. Therefore, the reservoir fluid chamber 8 formed by the cylinder bottom 5, the standpipe 6, and the reservoir piston 7 varies in terms of volume according to a running amount of fluid.

The piston 2 is provided with a piston rod 2a, and a rod end 2b. The standpipe 6 is arranged to be fitted into an inner peripheral surface of the piston rod 2a having a hollow structure. A seal 15 is arranged so that the fluid does not leak out from the gap between the piston 2 and the cylinder 4. A snubber ring 14 and a snubber ring 16 are arranged so as to adjust the running amount of the fluid from the cylinder during a snubbing action.

Extension and retraction actions of the electro hydrostatic actuator of the present invention will be described. First, in the case where the piston 2 is extended (a white arrow), the rotation of the motor 18 is switched by a signal from the controller 17, so that a pump part 19a becomes the inlet side and a pump part 19b becomes the outlet side. When the fluid is sufficiently supplied into the bore side fluid chamber 12 by operation of the fluid pump 19, the piston 2 moves to the extension side.

Meanwhile, in the case where the piston 2 is compressed (a hatched arrow), the rotation of the motor 18 is switched by a signal from the controller 17, so that the pump part 19b becomes the inlet side and the pump part 19a becomes the outlet side. When the fluid is sufficiently supplied into the annulus side fluid chamber 11 by the operation of the fluid pump 19, the piston 2 is moved to the retraction side.

Figure 3:
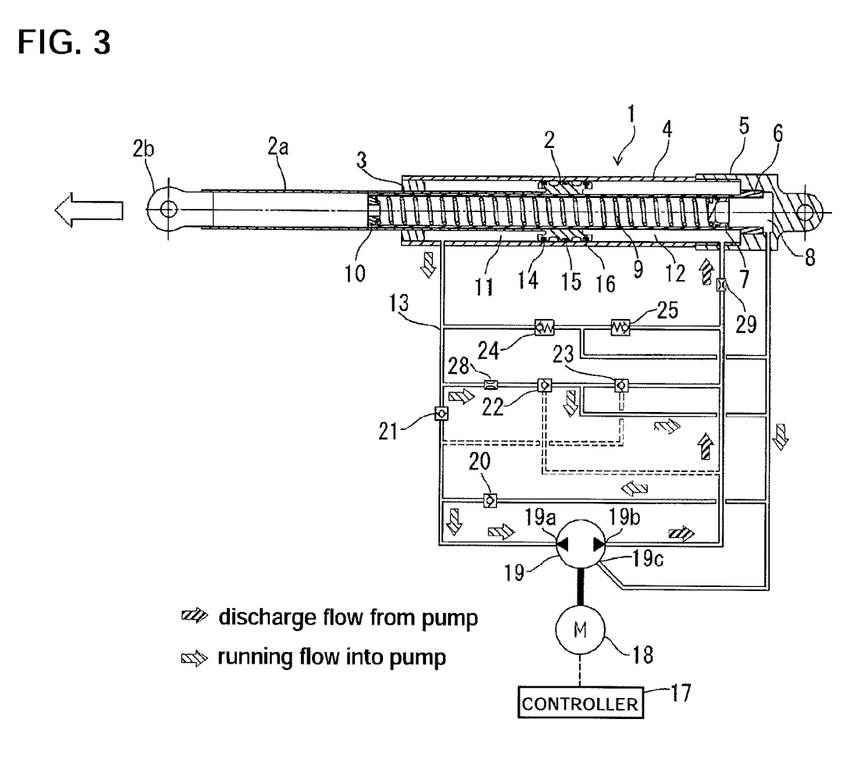
FIG. 3 is a view showing a flow of fluid in the electro hydrostatic actuator of the present invention when a piston is extended.

FIG. 3 is a view showing a flow of fluid in the electro hydrostatic actuator of the present invention in the case where the piston is extended.

In the case where the piston 2 is extended, as shown in FIG. 3, the direction of rotation of the motor 18 is controlled by the signal from the controller 17, so that the pump part 19a becomes the inlet side and the pump part 19b becomes the outlet side. The fluid discharged from the pump part 19b by the operation of the pump 19 flows into the bore side fluid chamber 12 (according to arrows showing a discharge flow from the pump in the figure).

When the fluid sufficiently flows into the bore side fluid chamber 12, the piston 2 moves to the extension side, so that the fluid of the annulus side fluid chamber 11 flows out. The fluid flowing out from the annulus side fluid chamber 11 reaches the pump part 19a via the pilot check valve 22 and the check valve 20 (according to arrows showing a running flow into the pump in the figure).

Next, an action of a snubbing mechanism of the electro hydrostatic actuator of the present invention will be described. In the following, the snubbing mechanism will be discussed for the same configuration as a cylinder type actuator shown in FIG. 1.

As shown in FIG. 1, when the piston 2 is extended and brought to the vicinity of the gland nut 3, the piston 2 covers the retraction side channel port 26. At this time, along with movement of the piston 2, the snubber ring 14 is pushed toward a side surface 2d of a groove of the piston 2 and moves, the side surface 2d being on the cylinder bottom side.

The snubber ring 14 has a structure in which slits are formed on a cylindrical body. Since an area of slits is smaller than that of an opening of the retraction side channel port 26, running speed of the fluid from the annulus side fluid chamber 11 through the snubber ring 14 to the retraction side channel port 26 is reduced. Thereby, in the case where the piston 2 is extended, travelling speed of the piston 2 is reduced in the vicinity of the gland nut, so that a snubbing function is realized.

Next, the flow of fluid immediately after starting snubbing action in the electro hydrostatic actuator of the present invention will be described.

Figure 4:
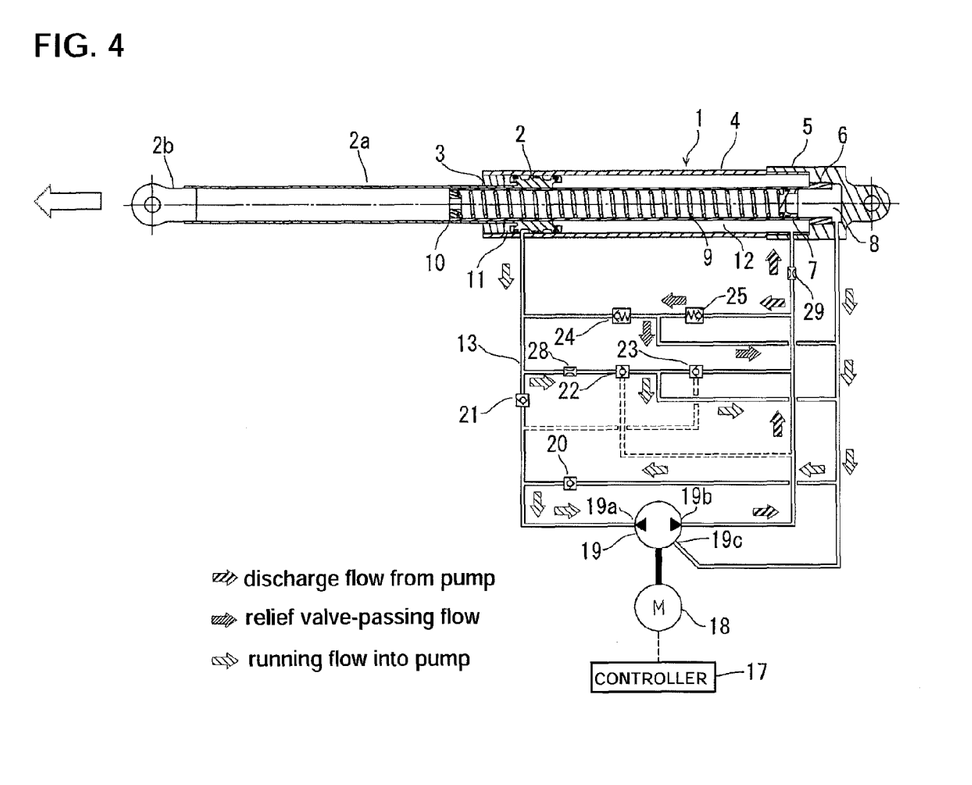
FIG. 4 is a view showing a flow of fluid immediately after starting snubbing action in the electro hydrostatic actuator of the present invention when the piston is extended.

FIG. 4 is a view showing the flow of fluid immediately after the start of the snubbing action in the electro hydrostatic actuator of the present invention in the case where the piston is extended.

In the case where the piston 2 is extended, the controller 17 controls the direction of rotation of the motor 18, so that the pump part 19b becomes the inlet side and the pump part 19b becomes the outlet side. Then, the pump 19 is activated, so that the fluid discharged from the pump part 19b flows into the bore side fluid chamber 12 (according to arrows showing a discharge flow from the pump in the figure).

When the fluid is sufficiently supplied into the bore side fluid chamber 12, the piston 2 moves to the extension side, so that the fluid flows out from the annulus side fluid chamber 11. The fluid flowing out from the annulus side fluid chamber 11 reaches the pump part 19a via the pilot check valve 22 and the check valve 20 (according to arrows showing a running flow into the pump in the figure).

Here, the flow rate of the fluid flowing out from the annulus side fluid chamber 11 is decreased by the snubbing mechanism. Meanwhile, since the flow rate of the fluid discharged from the pump 19 is constant, the bore side fluid chamber 12 comes to have a high fluid pressure. When the pressure of the fluid of the bore side fluid chamber 12 becomes higher than a predetermined value, the fluid passes through the relief valve 25 (according to arrows showing a relief valve-passing flow in the figure). The fluid passing through the relief valve 25 accumulates in the reservoir fluid chamber 8 or reaches the pump part 19a via the check valve 20.

Next, the snubbing control method of the present invention will be described based on the case where the piston 2 is extended. At the time of starting extension motion, the piston 2 is at a dead end of stroke on the cylinder bottom 5 side. Then, the motor 18 is rotated by a command of the controller 17, so that the piston moves by the principle described above with FIG. 3. At this time, although the load torque of the motor 18 is not constant, the number of revolutions of the motor 18 may be fixed.

When the piston 2 moves and the piston covers the retraction side channel port 26 as shown in FIG. 1, the fluid passes through the relief valve 25 as shown in FIG. 4. At this time, the load torque of the motor 18 is dramatically increased.

Since the controller 17 calculates the load torque imposed on the motor 18, the controller 17 controls the rotation of the motor 18 according to an increase in the load torque so that the number of revolutions thereof becomes lower. Desirably, the number of revolutions of the motor 18 at this time is adjusted so that the running amount of the fluid into the cylinder 4 per unit time is the same as the running amount of the fluid discharged from the pump per unit time. Desirably, the number of revolutions of the motor is maintained to be lower until the piston 2 reaches the dead end of stroke and the snubbing action is completed.

With the snubbing control method of the present invention, in a state that the fluid immediately after the start of the snubbing action passes through the relief valve 25, by calculating the load torque of the motor by the controller 17 and controlling the number of revolutions of the motor 18 so as to become lower, the running amount of the fluid discharged from the pump 19 during the snubbing action can be decreased, so that a running amount of an excess fluid circulated in a circuit can be decreased.

With the snubbing control method of the present invention, when the number of revolutions of the motor 18 is controlled to be constant, and after the load torque exceeds a predetermined value, the number of revolutions of the motor 18 is controlled to be lower, the running amount of the excess fluid circulated in the circuit can be easily and reliably decreased.

The snubbing control method of the present invention is described above with the case where the piston is extended. However, the effects thereof are the same with the case where the piston is compressed.

Next, the configuration example of the drive device for the electro hydrostatic actuator according to the present invention will be described based on FIG. 2. An actuator drive device 30 shown in FIG. 2 includes the motor 18, and the controller 17 for controlling the number of revolutions of the motor 18. The controller 17 calculates the load torque imposed on the motor 18 from an instant electric current value and the instant number of revolutions of the motor 18, and controls the number of revolutions of the motor 18 according to the load torque thus obtained According to the drive device 30 for the electro hydrostatic actuator of the present invention, the number of revolutions of the motor 18 for driving the pump 19 for supplying fluid into the fluid chambers of the cylinder 4 is controlled by the controller 17 according to the load torque imposed on the motor 18. Thus, the impact due to collision between the piston and the cylinder is relaxed, so that breakage failure of the actuator can be prevented.

With the drive device 30 for the electro hydrostatic actuator of the present invention, the controller 17 can control the rotation number of the motor 18 so that the rotation number is fixed, and after the load torque imposed on the motor 18 exceeds a fixed value, control the rotation number of the motor 18 so that the rotation number becomes lower. Thereby, easily and reliably, the impact at the time of the collision between the piston and the cylinder can be eased and the breakage of the actuator can be prevented.

EXAMPLES

With the electro hydrostatic actuator shown in FIG. 2, the load torque of the motor and the like during the snubbing action were measured both in the case where the number of revolutions of the motor is controlled according to the load torque of the motor according to the present invention and in the case where the rotation of the motor is constant without any control, so that the validity of the present invention was confirmed.

Figure 5A:
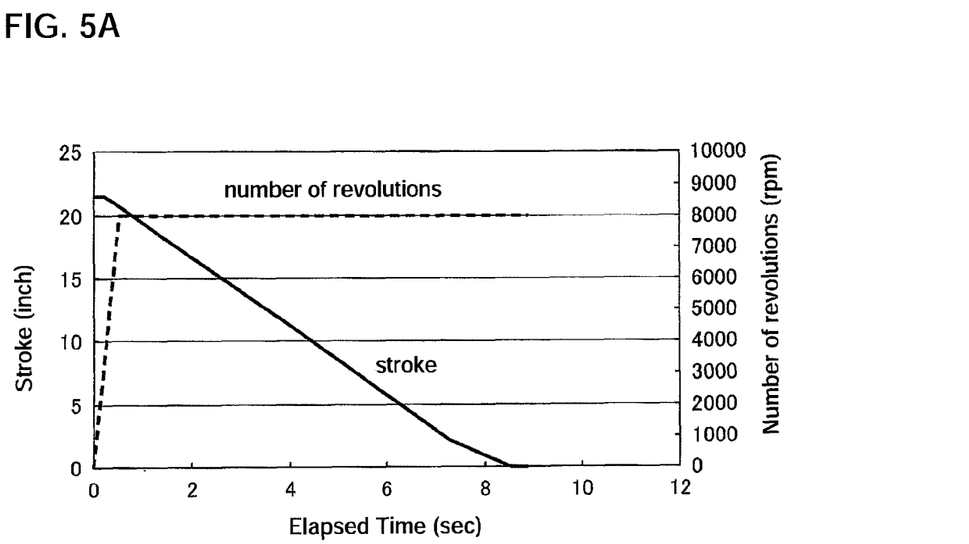
FIG. 5A shows relationships for the stroke of the actuator and the number of revolutions of the motor.
Figure 5B:
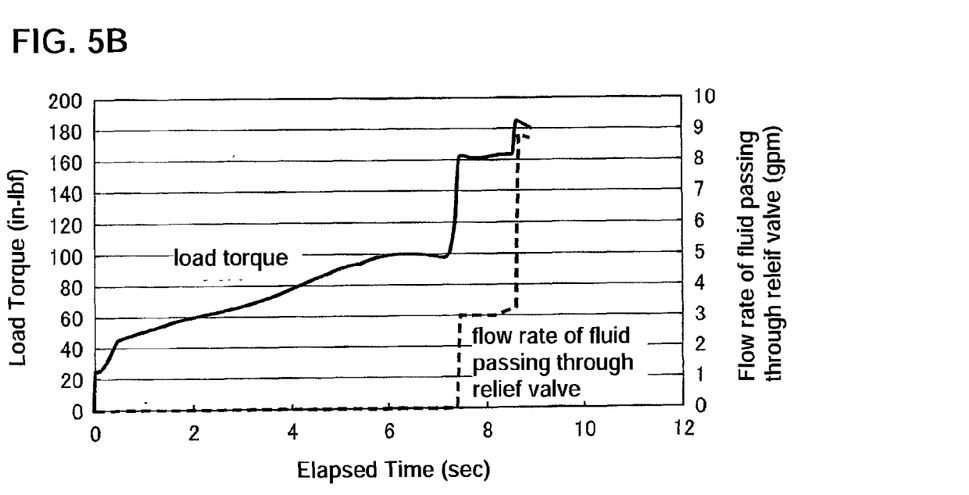
FIG. 5B shows the relationships between the load torque and a flow rate of fluid passing through a relief valve, and the elapsed time.

FIGS. 5A and 5B are graphs showing relationships between elapsed time and load torque and the like in the conventional actuator. FIG. 5A shows the relationships between elapsed time, and the number of revolutions of the motor and the stroke of the cylinder. FIG. 5B shows the relationships between elapsed time, and the load torque imposed on the motor and a flow rate of the fluid passing through the relief valve 25 per unit time. With the actuator shown in FIG. 2, the measurement was performed when the motor 18 was rotated at a speed of 8,000 rpm and the extension motion was executed.

A waveform of a solid line shown in FIG. 5A indicates the stroke of the piston 2. Since the gradient is changed after a lapse of about seven seconds, it can be confirmed that the snubbing mechanism is activated. A waveform of a broken line shown in FIG. 5A indicates the number of revolutions of the motor 18. It can be confirmed that the motor 18 is controlled by the controller 17 such that its number of revolutions is maintained to be constant.

A waveform of a solid line shown in FIG. 5B indicates the load torque of the motor 18. It can be confirmed that the load torque of the motor 18 is increased after a lapse of about seven seconds after the start of the action of the snubbing mechanism. A waveform of a broken line shown in FIG. 5B indicates the flow rate of the fluid passing through the relief valve 25 per unit time. It can be confirmed that the flow rate of the fluid passing through the relief valve 25 per unit time is increased after a lapse of about seven seconds after the start of the action of the snubbing mechanism.

Figure 6A:
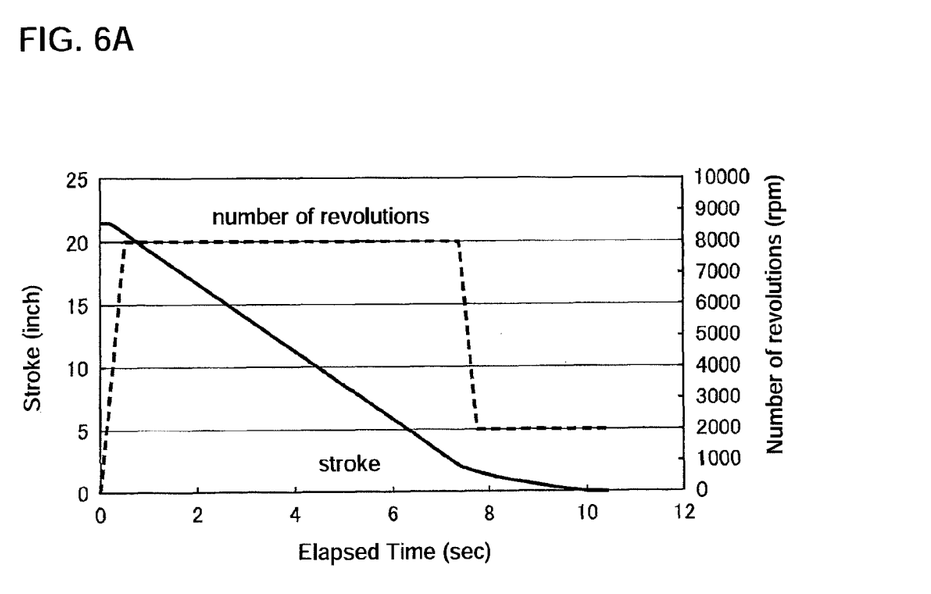
FIG. 6A shows the relationships for the stroke and the number of revolutions of the motor.
Figure 6B:
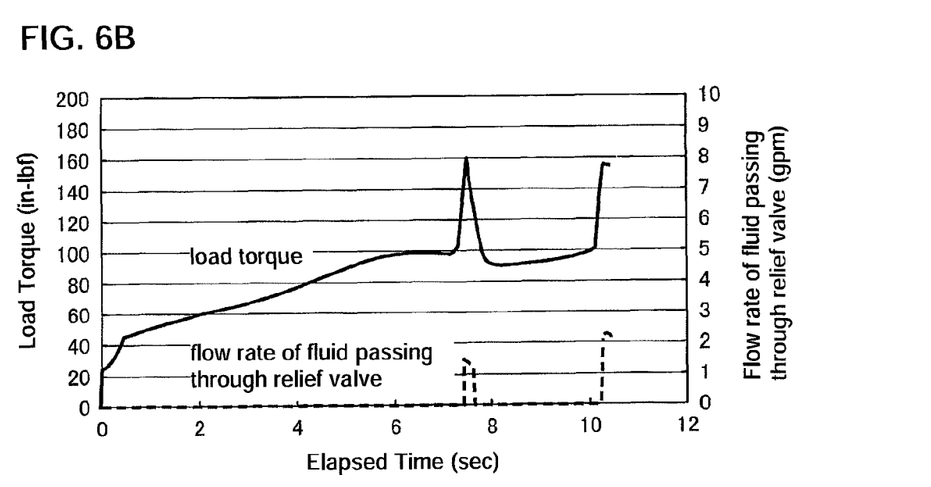
FIG. 6B shows the relationships between the load torque and a flow rate of fluid passing through a relief valve, and the elapsed time.

FIGS. 6A and 6B are graphs showing relationships between elapsed time and the load torque of the motor and the like in the electro hydrostatic actuator of the present invention. FIG. 6A shows the relationships between elapsed time, and the number of revolutions of the motor and the stroke of the cylinder. FIG. 6B shows the relationships between elapsed time, and the load torque of the motor and a flow rate of the fluid passing through the relief valve 25. With the actuator shown in FIG. 3, the measurement was performed when the extension motion was executed from where the piston is positioned midway along the length of the cylinder.

At this time, the number of revolutions of the motor 18 was controlled to be 8,000 rpm at the beginning, and in the case where the load torque of the motor 18 exceeded 120 in-1 bf, the number of revolutions of the motor after that was controlled to be 2,000 rpm.

A waveform of a solid line shown in FIG. 6A indicates the stroke of the piston 2. Since the gradient is changed after a lapse of about seven seconds, it can be confirmed that the snubbing mechanism is activated, resulting in reducing the travelling speed of the piston. A waveform of a broken line shown in FIG. 6A indicates the number of revolutions of the motor 18. It can be confirmed that the number of revolutions is controlled to be 8,000 rpm before a lapse of about seven seconds after the start of the snubbing action, and 2,000 rpm after a lapse of about seven seconds after the start of the snubbing action.

A waveform of a solid line shown in FIG. 6B indicates the load torque of the motor 18. It can be confirmed that the load torque of the motor 18 temporarily exceeds 120 in-1 bf after a lapse of about seven seconds after the start of the action of the snubbing mechanism, whereas the number of revolutions of the motor 18 is controlled to be 2,000 rpm by a control means, so that the load torque is suppressed to be low.

A waveform of a broken line shown in FIG. 6B indicates the flow rate of the fluid passing through the relief valve 25 per unit time. The flow rate of the fluid passing through the relief valve 25 per unit time is temporarily increased after a lapse of about seven seconds after the start of the action of the snubbing mechanism. It can be confirmed that after that, the number of revolutions of the motor 18 is controlled to be 2,000 rpm by a control means, so that the flow rate of the fluid passing through the relief valve 25 per unit time is suppressed to be low.

When comparing the flow rate of the fluid passing through the relief valve 25 per unit time in the conventional control method (the waveform of the broken line shown in FIG. 5B) and the flow rate of the fluid passing through the relief valve 25 per unit time in the case where the electro hydrostatic actuator of the present invention is used and the control method of the present invention is implemented (the waveform of the broken line shown in FIG. 6B), it can be confirmed that the flow rate of the fluid passing through the relief valve 25 during the snubbing action is dramatically decreased.

An increase in a temperature of the fluid is 8.14° C. with the conventional control method. Meanwhile, in the case where the control method of the present invention is implemented, the increase is 0.31° C. Therefore, it can be confirmed that the increase in the temperature of the fluid with the control method of the present invention is not more than one-twentieth of that in the conventional control method.

In such a way, it can be confirmed that when the electro hydrostatic actuator excellent in a snubbing characteristic of the present invention is used, the impact due to the collision between the piston and the cylinder can be relaxed, energy efficiency during the snubbing action can be improved, and the increase in the temperature of the fluid can be suppressed to be low.

As described above, with the electro hydrostatic actuator of the present invention, and the drive device for the actuator, and the snubbing control method for the same, by controlling the number of revolutions of the motor according to the load torque, the circulation of the excess fluid in the hydrostatic circuit during the snubbing action can be decreased.

Thereby, the impact due to the collision between the piston and the cylinder can be relaxed, and the energy efficiency of the actuator can be improved, so that the breakage failure of the actuator along with the increase in the temperature of the fluid can be prevented. Since the excess fluid during the snubbing action can be decreased, the increase in the temperature of the drive device is decreased, so that the breakage failure of the drive device along with the increase in the temperature of the drive device can be prevented.

Therefore, when the electro hydrostatic actuator of the present invention, and the drive device used for the same, and the snubbing control method for the same are used for retraction and extension of the landing gear of an airplane, improvement in a fuel consumption rate at the time of flight, and it becomes possible to realize the reduction in maintenance time that might be incurred by the breakage failure of the actuator and drive device.

In such a way, the electro hydrostatic actuator of the present invention, and the drive device used for the same, and the snubbing control method for the same are excellent in the energy efficiency and hence can be widely applied to not only the retraction/extension of the landing gear of the airplane but also various actuators.

What is claimed is:

1. An electro hydrostatic actuator excellent in a snubbing characteristic, comprising:
　　a cylinder type actuator main body;
　　a piston having a piston rod, the piston slidingly moving in a cylinder of the actuator main body;
　　a motor;
　　a pump for supplying a fluid according to the rotation of the motor;
　　a mechanism for adjusting a running amount of the fluid into and from the cylinder according to the motion of the piston;
　　a reservoir for adjusting the supply of the fluid corresponding to a volume difference generated according to the motion of the piston; and
　　a control means for calculating load torque imposed on the motor from an electric current value and the number of revolutions of the motor, and controlling the number of revolutions of the motor according to the calculated load torque imposed on the motor.

2. The electro hydrostatic actuator according to claim 1, wherein
　　the control means controls the rotation of the motor so that the rotation number becomes lower in the case where the load torque of the motor exceeds a predetermined value.

3. A drive device used for an electro hydrostatic actuator excellent in a snubbing characteristic, comprising:
　　a motor for driving a pump, the pump for supplying fluid to two fluid chambers of a cylinder partitioned by a piston; and
　　a controller which calculates load torque imposed on the motor from an electric current value and the number of revolutions of the motor, and which controls the number of revolutions of the motor according to the calculated load torque imposed on the motor.

4. The drive device for the electro hydrostatic actuator according to claim 3, wherein
　　the controller controls the rotation of the motor so that the number of revolutions becomes lower in the case where the load torque imposed on the motor exceeds a predetermined value.

5. A snubbing control method for an electro hydrostatic actuator to be applied to an electro hydrostatic actuator which comprises:
　　a cylinder type actuator main body;
　　a piston having a piston rod, the piston slidingly moving in a cylinder of the actuator main body;
　　a motor;
　　a pump for supplying fluid according to the rotation of the motor;
　　a controller which calculates load torque of the motor from an electric current value and the number of revolutions of the motor, and which controls the rotation of the motor;
　　a mechanism for adjusting a running amount of the fluid into and from the cylinder according to the motion of the piston; and
　　a reservoir for adjusting the supply of the fluid corresponding to a volume difference generated according to the motion of the piston,
　　wherein the number of revolutions of the motor is controlled according to the load torque calculated by the controller.

6. The snubbing control method for the electro hydrostatic actuator according to claim 5, wherein in controlling the number of revolutions of the motor, the rotation of the motor is controlled so that the number of revolutions becomes lower when the load torque calculated by the controller exceeds a predetermined value.

\* \* \* \* \*